(12) United States Patent
Wen et al.

(10) Patent No.: US 12,548,720 B2
(45) Date of Patent: Feb. 10, 2026

(54) KEY STRUCTURE AND PORTABLE COMPUTER USING THE SAME

(71) Applicant: Acer Incorporated, New Taipei (TW)

(72) Inventors: Chun-Hung Wen, New Taipei (TW); Hui-Ping Sun, New Taipei (TW); Jui-Yi Yu, New Taipei (TW); Yen-Chou Chueh, New Taipei (TW); Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 279 days.

(21) Appl. No.: 18/354,654

(22) Filed: Jul. 19, 2023

(65) Prior Publication Data

US 2024/0203673 A1    Jun. 20, 2024

(30) Foreign Application Priority Data

Dec. 14, 2022   (TW) .................. 111147906

(51) Int. Cl.
*H01H 13/7065*  (2006.01)
*G06F 1/16*  (2006.01)
*G06F 3/02*  (2006.01)

(52) U.S. Cl.
CPC ....... *H01H 13/7065* (2013.01); *G06F 1/1662* (2013.01); *G06F 3/0202* (2013.01); *H01H 2223/024* (2013.01); *H01H 2233/07* (2013.01)

(58) Field of Classification Search
CPC . G05G 1/00–02; G06F 1/1662; G06F 3/0202; H01H 13/00–88; H01H 2223/024; H01H 2233/07
USPC ...................................... 361/679.08
See application file for complete search history.

(56) References Cited

U.S. PATENT DOCUMENTS

| | | | |
|---|---|---|---|
| 9,098,250 B2* | 8/2015 | Doi ........................ | G06F 1/18 |
| 10,032,574 B2* | 7/2018 | Chen ...................... | H01H 3/125 |
| 2016/0336127 A1* | 11/2016 | Leong .................... | H01H 13/85 |

* cited by examiner

*Primary Examiner* — Imani N Hayman
*Assistant Examiner* — Ross Terry Mularski
(74) *Attorney, Agent, or Firm* — JCIPRNET

(57) ABSTRACT

A key structure includes a base, a bracket, a sensing circuit, an elastic member, a key cap, and a screwing member. The bracket is disposed on the base, the sensing circuit is disposed on the bracket, and the sensing circuit has an opening. The elastic member is disposed on the sensing circuit and covers the opening. The key cap is disposed on the elastic member. The screwing member passes through the opening and screws the bracket to the base, and the key cap, the elastic member, and the screwing member are coaxially arranged. In addition, a portable computer.

18 Claims, 6 Drawing Sheets

FIG. 6

KEY STRUCTURE AND PORTABLE COMPUTER USING THE SAME

CROSS-REFERENCE TO RELATED APPLICATION

This application claims the priority benefit of Taiwan application serial no. 111147906, filed on Dec. 14, 2022. The entirety of the above-mentioned patent application is hereby incorporated by reference herein and made a part of this specification.

BACKGROUND

Technical Field

The disclosure relates to a key structure and a portable computer using the same.

Description of Related Art

In a conventional notebook computer or a portable electronic device disposed with a keyboard module, the keyboard module usually needs to be assembled with a lot of screws and rivets, the production cost is high, and the assembly is inconvenient.

Furthermore, such move often requires corresponding keyholes to be provided from the bottom of the mainframe of the notebook computer for the top shell, the bottom shell, and the keyboard module of the mainframe, so that the keyboard module can be smoothly assembled on the top surface of the mainframe. In other words, whether it is for installation or maintenance, the technician must turn the mainframe over (so that the bottom surface of the mainframe is facing upwards), and after removing the screws, turn the mainframe over so that the top surface of the mainframe is facing upwards before continuing to remove the shell and the keyboard module one by one.

In addition, the disassembly or maintenance of many elements inside the notebook computer, such as the hard disk drive, the central processing unit or various interface cards, all need the keyboard module to be removed first. If the keyboard module is screwed in the above-mentioned assembling method, inconvenience is added to the maintenance, which is labor-intensive and time-consuming.

SUMMARY

The disclosure provides a key structure and a portable computer. The key structure provides a screwing member to screw a bracket and a base together, so that the structure is further simplified and compact.

The key structure of the disclosure includes a base, a bracket, a sensing circuit, an elastic member, a key cap, and a screwing member. The bracket is disposed on the base, the sensing circuit is disposed on the bracket, and the sensing circuit has an opening. The elastic member is disposed on the sensing circuit and covers the opening. The key cap is disposed on the elastic member and shields the elastic member. The screwing member passes through the opening and screws the bracket to the base. The key cap, the elastic member, and the screwing member are coaxially arranged, and the elastic member covers and shields the screwing member.

The portable computer of the disclosure includes a body and a keyboard module. The body has a base. The keyboard module includes a bracket, a sensing circuit, and at least one key. The bracket is disposed on the base, the sensing circuit is disposed on the bracket, and the sensing circuit has at least one opening. The key includes an elastic member, a key cap, and a screwing member. The elastic member is disposed on the sensing circuit and covers the opening. The key cap detachably abuts on the elastic member and shields the elastic member. The screwing member passes through the opening and screws the bracket to the base. The key cap, the elastic member, and the screwing member are coaxially arranged, and the elastic member covers and shields the screwing member.

Based on the above, the key structure screws the bracket to the base through the screwing member. The sensing circuit has the opening, and the screwing member first passes through the opening and is screwed to the base, and then assembled thereon with the elastic member and the key cap in sequence, so as to achieve the state of coaxial arrangement of the key cap, the elastic member, and the screwing member, that is, the elastic member spans and covers the opening and the screwing member, and the key cap covers the elastic member.

In other words, the key structure of the disclosure and the portable computer using the same can effectively simplify the assembly type of the keyboard module on the body through the configuration of the above-mentioned components, which is equivalent to the keyboard module and the body being able to be screwed together through the aforementioned screwing member. In this way, the peripheral structure for the existing keyboard module configured to be assembled with the body can be simplified, and the inner space of the key structure is utilized as the screwing space of the screwing member, which can further make the assembly type between the keyboard module and the body be further compacted.

As far as the body is concerned, the above-mentioned key structure and the keyboard module are equivalent to being disassembled from the top side of the body, so a user can smoothly assemble the keyboard module to the body or disassemble the keyboard module from the body without repeatedly turning over the body as mentioned above. Moreover, such a compact and centralized disassembly structure facilitates the improvement in the operation efficiency of assembly and maintenance.

DESCRIPTION OF THE EMBODIMENTS

Figure 1:
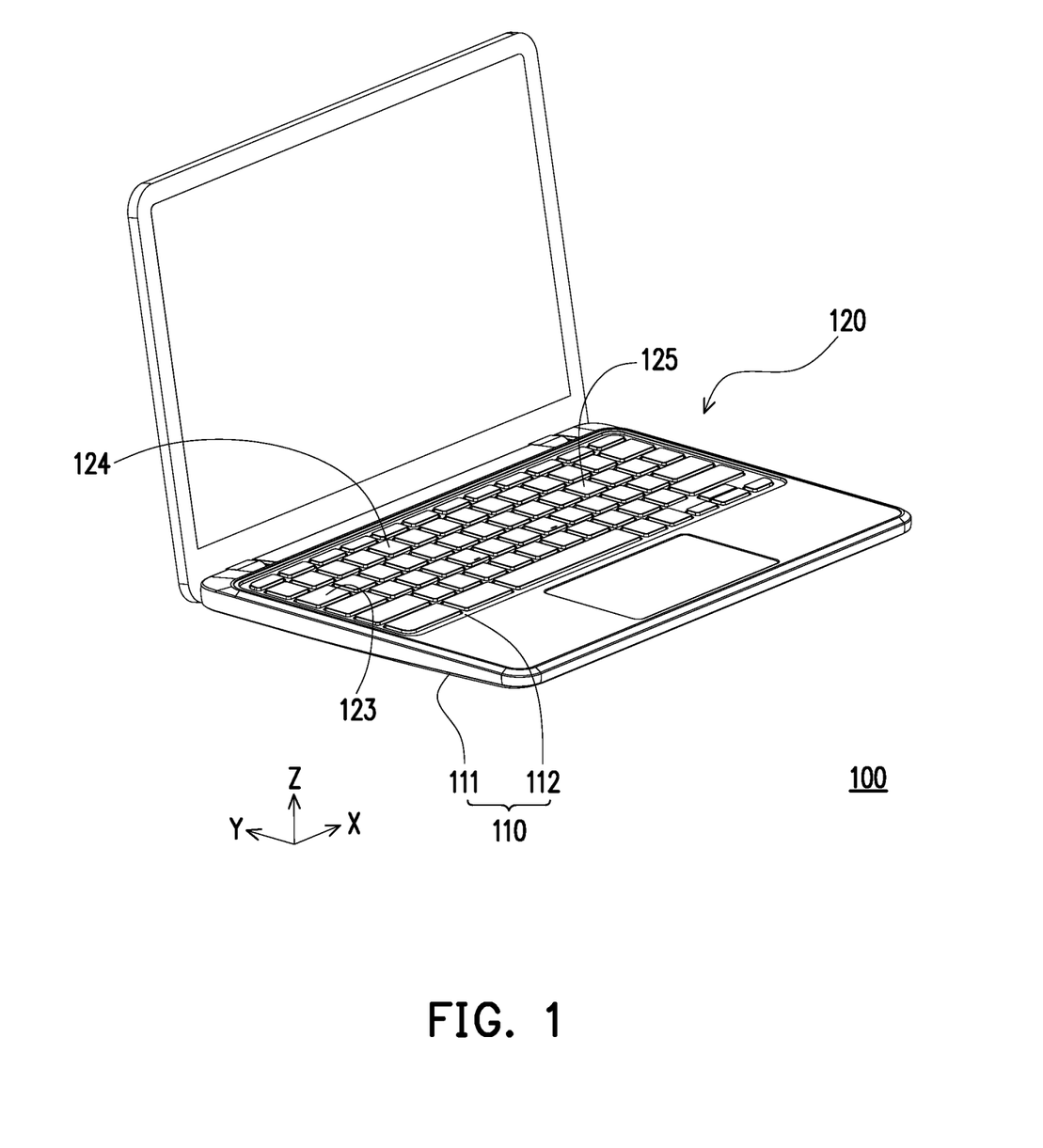
FIG. 1 is a schematic diagram of a portable computer according to an embodiment of the disclosure.
Figure 2:
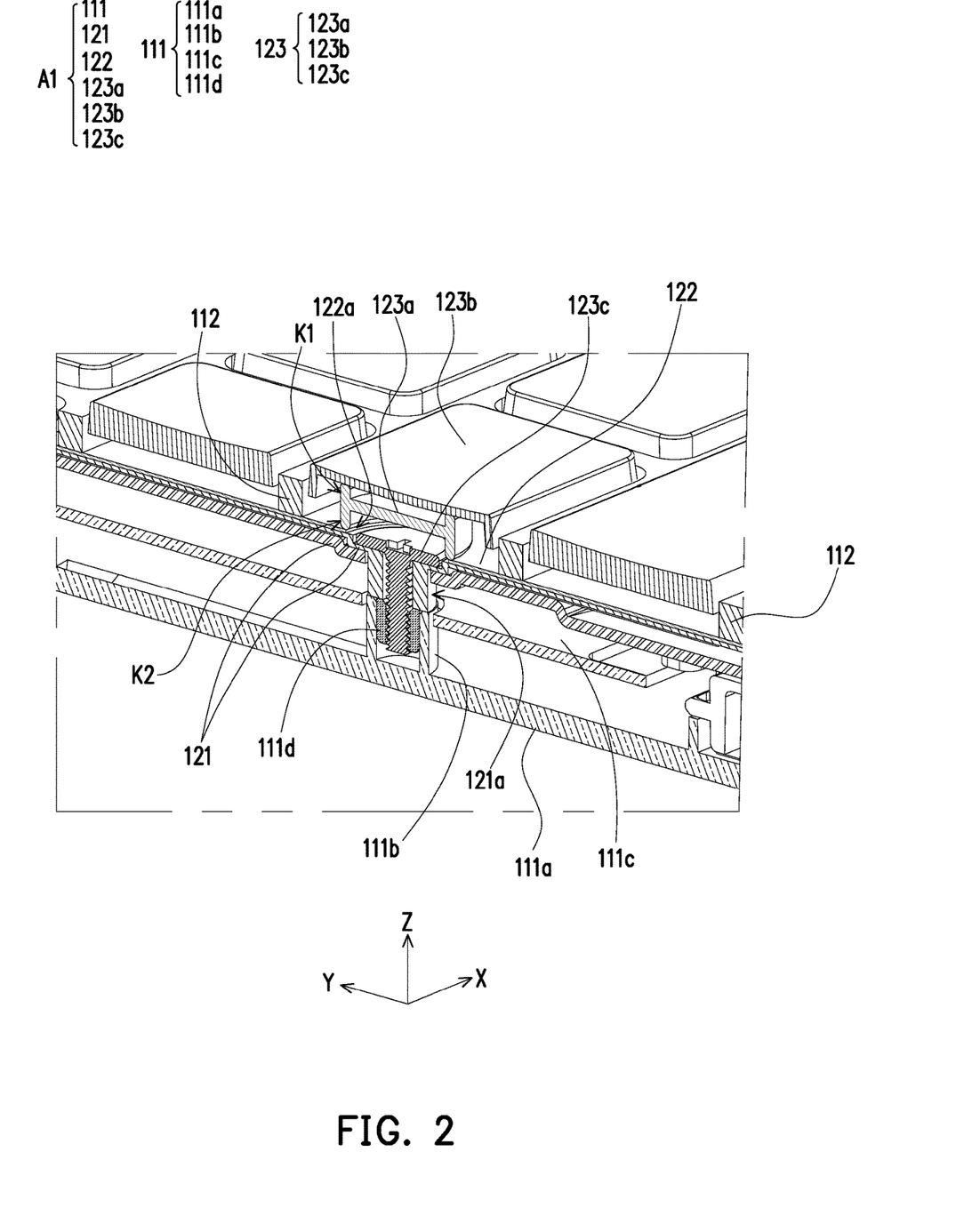
FIGS. 2 and 3 are partial cross-sectional views of the portable computer shown in FIG. 1.
Figure 3:
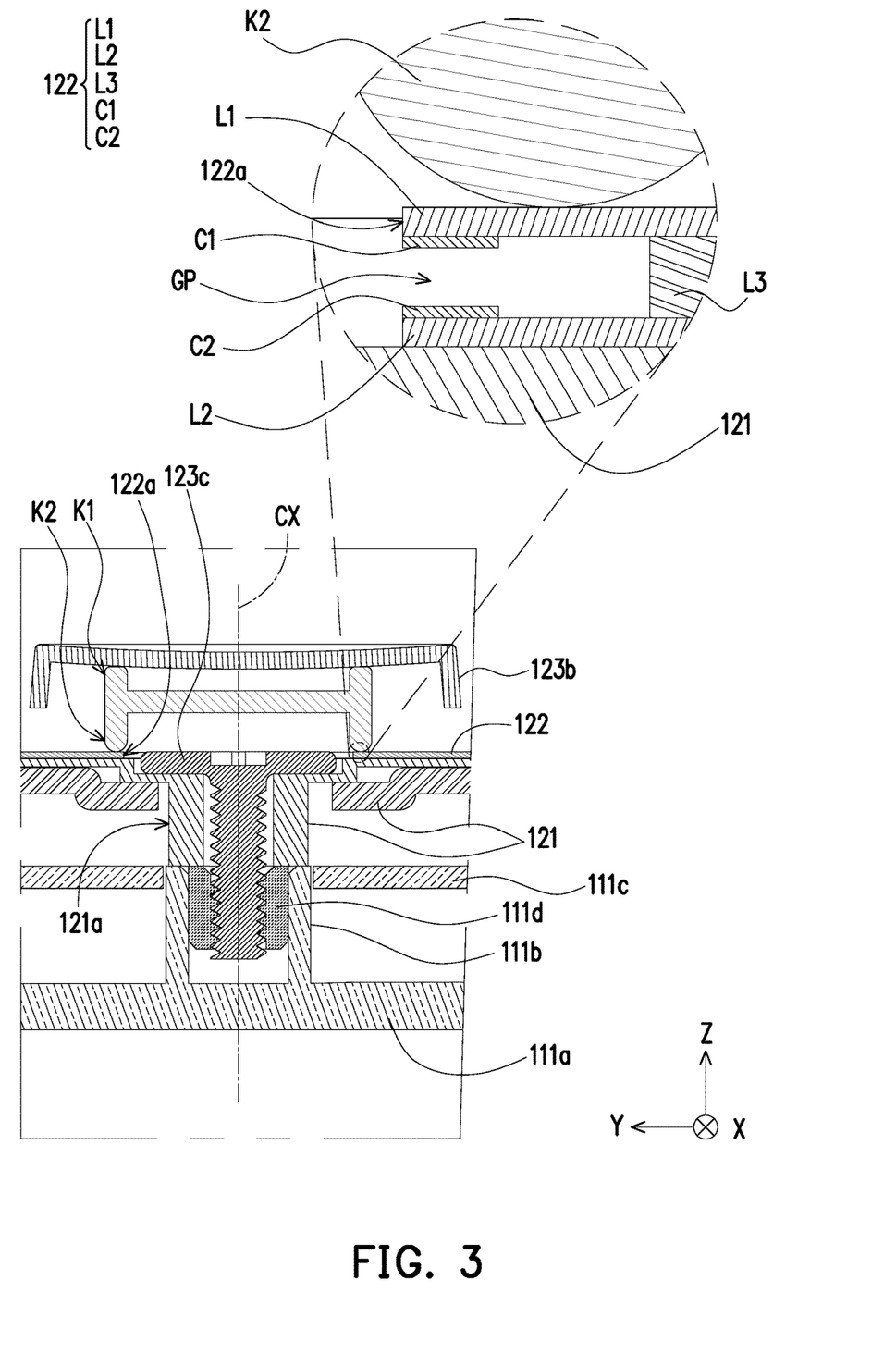

FIG. 1 is a schematic diagram of a portable computer according to an embodiment of the disclosure. FIGS. 2 and 3 are partial cross-sectional views of the portable computer shown in FIG. 1. Cartesian coordinates X-Y-Z are provided in the drawings for the convenience of description. Please refer to FIGS. 1 to 3 at the same time. In the embodiment, a portable computer 100, taking a notebook computer as an example, includes a body 110 and a keyboard module 120.

The body 110 has a base 111. The keyboard module 120 includes a bracket 121, a sensing circuit 122, and at least one key. As shown in FIG. 1, for the convenience of description, the disclosure takes keys 123, 124, and 125 shown in FIG. 1 as examples and describes the keys 123, 124, and 125 one by one in subsequent embodiments and corresponding drawings.

Figure 4:
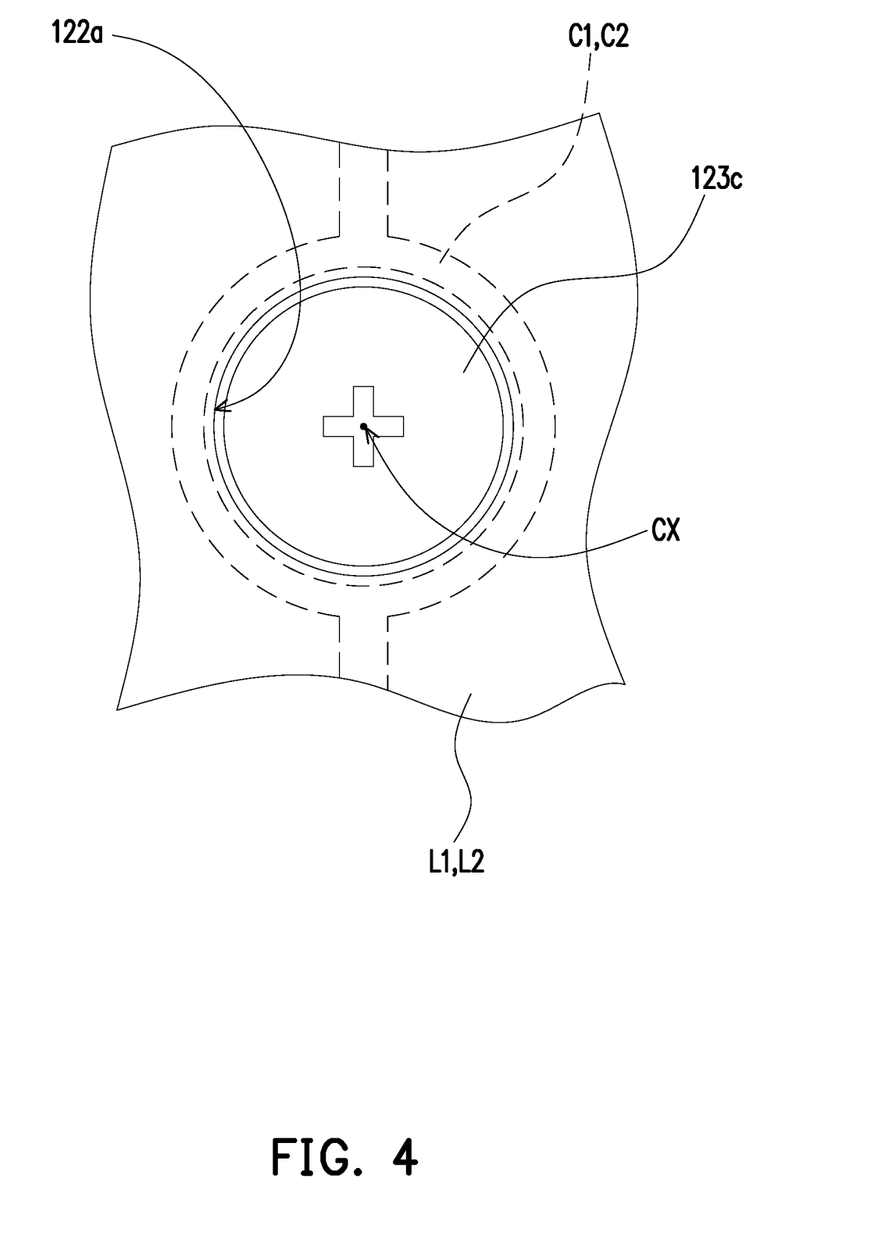
FIG. 4 is a partial top view of the portable computer in FIG. 2 at the key structure.

First, it is the key 123 shown in FIGS. 1 to 3. FIG. 4 is a partial top view of the key structure of the portable computer in FIG. 2. Please refer to FIGS. 2 to 4 at the same time. In the embodiment, the bracket 121 is disposed on the base 111, the sensing circuit 122 is disposed on the bracket 121, and the sensing circuit 122 has at least one opening (here, taking an opening 122a as an example). The key 123 includes an elastic member 123a, a key cap 123b, and a screwing member 123c. The elastic member 123a, that is, the rubber dome, is disposed on the sensing circuit 122 and covers the opening 122a. The key cap 123b detachably abuts on the elastic member 123a and shields the elastic member 123a. The screwing member 123c passes through the opening 122a and screws the bracket 121 to the base 111, and the key cap 123b, the elastic member 123a, and the screwing member 123c are coaxially arranged (a central axis CX shown in FIG. 3), and the elastic member 123a covers and shields the screwing member 123c.

Further, as shown in FIG. 3, the sensing circuit 122 includes an upper circuit layer L1, a lower circuit layer L2, and an insulating layer L3. The upper circuit layer L1 has a conductive portion C1, and the lower circuit layer L2 has a conductive portion C2. The insulating layer L3 is disposed between the upper circuit layer L1 and the lower circuit layer L2, and the lower circuit layer L2 is disposed on the bracket 121. When the key cap 123b is not pressed by an external force, the conductive portion C1 of the upper circuit layer L1 and the conductive portion C2 of the lower circuit layer L2 face each other across a gap GP. When the key cap 123b is pressed by an external force, the key cap 123b exerts force on the upper circuit layer L1 through the elastic member 123a, so that the conductive portion C1 of the upper circuit layer L1 and the conductive portion C2 of the lower circuit layer L2 travel through the gap GP, abut on each other, and conduct electrical conduction, thereby generating an electrical signal required to be generated when the key 123 is pressed and triggered.

As shown in FIG. 2, a key structure A1 of the embodiment is equivalent to being composed of the base 111, the bracket 121, the sensing circuit 122, the elastic member 123a, the key cap 123b, and the screwing member 123c. As shown in FIGS. 3 and 4, the conductive portion C1 of the upper circuit layer L1 surrounds the opening 122a, and the conductive portion C2 of the lower circuit layer L2 surrounds the opening 122a. In order to allow the screwing member 123c to smoothly utilize the inner range of the key structure A1, thus the required conditions are fulfilled by the disposition of the above-mentioned conductive portions C1 and C2.

It is worth mentioning that since the screwing member 123c has screwed the bracket 121 and the base 111 together, the purpose of the screwing member 123c that the keyboard module 120 may be disassembled from and assembled to the top of the body 110 has been achieved through the key structure A1. The reason is that the inner range of the key structure A1 is utilized without disposing an additional screwing area on other parts of the body 110 (in addition to the keyboard module 120), so that a compact structure may be provided. What is more, a central section of the elastic member 123a is H-shaped and has an upper skirt portion K1 and a lower skirt portion K2 corresponding to each other.

The key cap 123b abuts on the upper skirt portion K1, the lower skirt portion K2 spans and surrounds the opening 122a, and the lower skirt portion K2 abuts on the sensing circuit 122. Therefore, for the screwing member 123c, the elastic member 123a, and the key cap 123b thereon can provide the effect of covering and shielding the screwing member 123c. Therefore, the screwing member 123c can be effectively hidden on the appearance of the portable computer 100, so as to achieve the desired simple and aesthetic effect. In addition, for a user, only the key cap 123b and the elastic member 123a need to be disassembled, and the screwing member 123c can be disassembled and assembled. In other words, the user does not need to turn over the body 110 repeatedly, so a facilitating effect is provided for the assembling and maintenance process of the portable computer 100.

In detail, as shown in FIG. 1, the body 110 of the embodiment is the mainframe of the notebook computer, which is composed of the base 111 and a top shell 112. Moreover, as shown in FIGS. 2 and 3, the screwing member 123c is a screw, the base 111 has a protruding post 111b, and the protruding post 111b has a screw hole adapted for the screw. In the embodiment, the screw hole is completed by disposing a stud 111d inside the protruding post 111b. The stud 111d is a metal hollow cylinder with threads on the inner cylinder, which is fixed to the inside of the protruding post 111b by thermal fusion, and then screwed by the screwing member 123c (the screw). In another non-illustrated embodiment, the protruding post 111b may also be directly tapped to obtain internal threads that can be adapted for the screwing member 123c.

Moreover, the bracket 121 of the embodiment further has a convex portion 121a, and the base 111 further includes a bottom shell 111a and a circuit board 111c. The protruding post 111b is, for example, integrally formed with the bottom shell 111a, the protruding post 111b passes through the circuit board 111c and abuts on the convex portion 121a of the bracket 121, which is also equivalent to the screwing member 123c passing through the convex portion 121a and the circuit board 111c in sequence and being screwed to the protruding post 111b on the bottom shell 111a of the base 111. In other words, the assembling method produced by the disclosure in response to the key structure A1 is that after sequentially stacking the bottom shell 111a (including the protruding post 111b and the stud 111d therein), the circuit board 111c, and the bracket 121, the user can perform screwing with the screwing member 123c, so that the bracket 121 of the keyboard module 120 and the base 111 are assembled together. Finally, the elastic member 123a and the key cap 123b are assembled in sequence, and the process of assembling the keyboard module 120 to the body 110 may be completed. Conversely, when disassembly is desired, only the key cap 123b and the elastic member 123a need to be disassembled first, and then the combination relationship between the keyboard module 120 and the body 110 can be released by disassembling the screwing member 123c.

Figure 5:
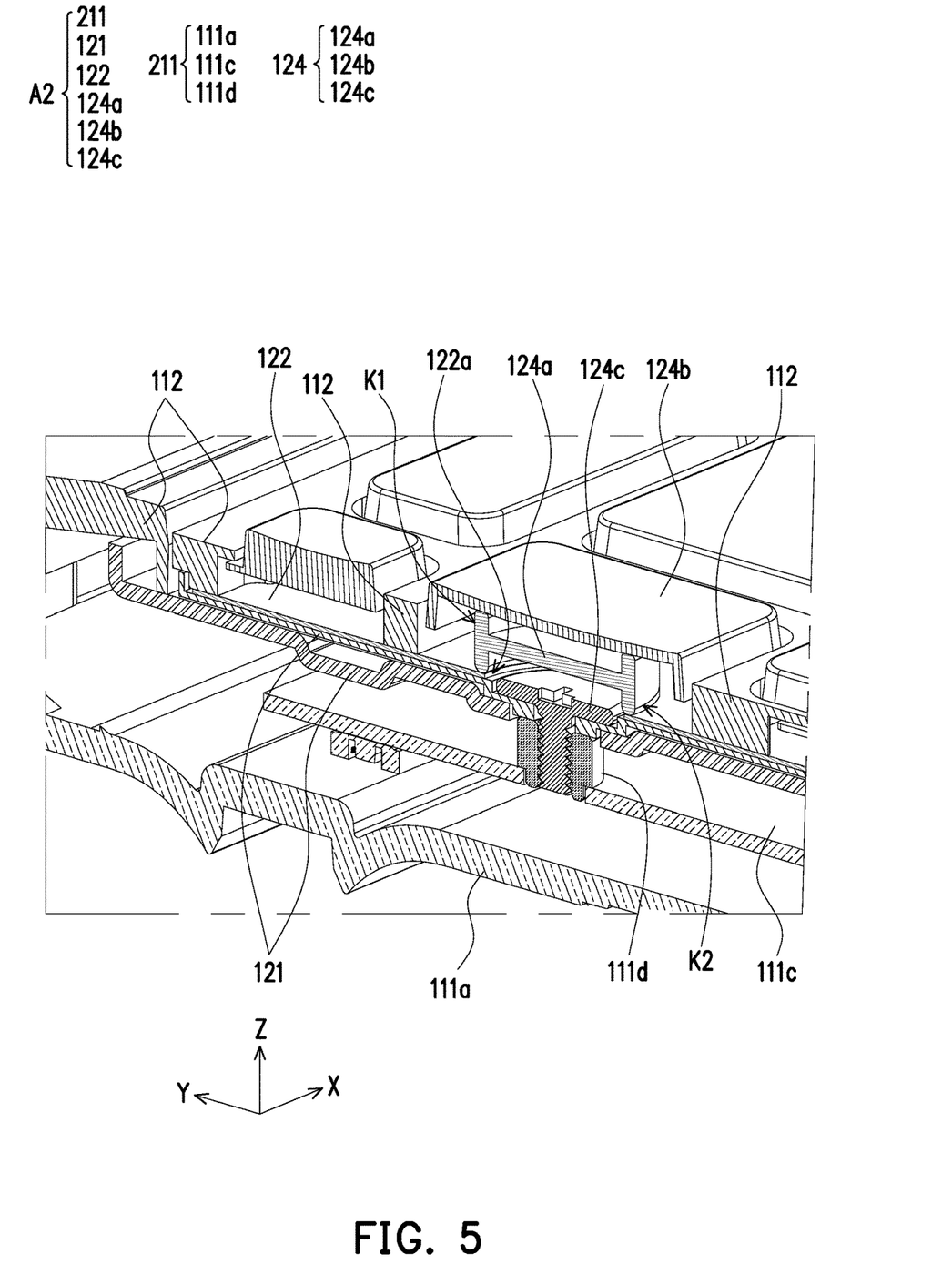
FIG. 5 is another partial cross-sectional view of the portable computer in FIG. 1.

FIG. 5 is another partial cross-sectional view of the portable computer in FIG. 1. Please refer to FIG. 5 and compare FIG. 5 with FIG. 1. In the embodiment, the key 124 is used as the target to illustrate another key structure A2. In the embodiment, the screwing member 123c, which is different from the previous embodiment, passes through the circuit board 111c. The key structure A2 of the embodiment substantially includes a base 211, the bracket 121, the sensing circuit 122, an elastic member 124a, a key cap 124b, and a screwing member 124c. The bracket 121, the sensing circuit 122, the elastic member 124a, and the key cap 124b are substantially the same as the previous embodiment, but the difference is that the base 211 of the embodiment substantially only includes the bottom shell 111a, the circuit board 111c, and the stud 111d. The circuit board 111c is assembled to the bottom shell 111a, the stud 111d is assembled to the circuit board 111c, and the screwing member 124c is directly screwed to the stud 111d on the circuit board 111c after passing through the opening 122a and the bracket 121.

In other words, in the embodiment, the circuit board 111c is first assembled to the bottom shell 111a, and then the bracket 121 and the circuit board 111c are screwed together with the screwing member 124c. Thus, the effect of combining the keyboard module 120 and the base 211 is achieved. Such a way facilitates the use when the bottom shell 111a is limited by the outline and cannot form the aforementioned protruding post 111b, or the space between the circuit board 111c and the bottom shell 111a needs to be disposed with other components or electronic elements and there is no space to form the aforementioned protruding post 111b, and can also achieve the same combination effect as the previous embodiment.

Figure 6:
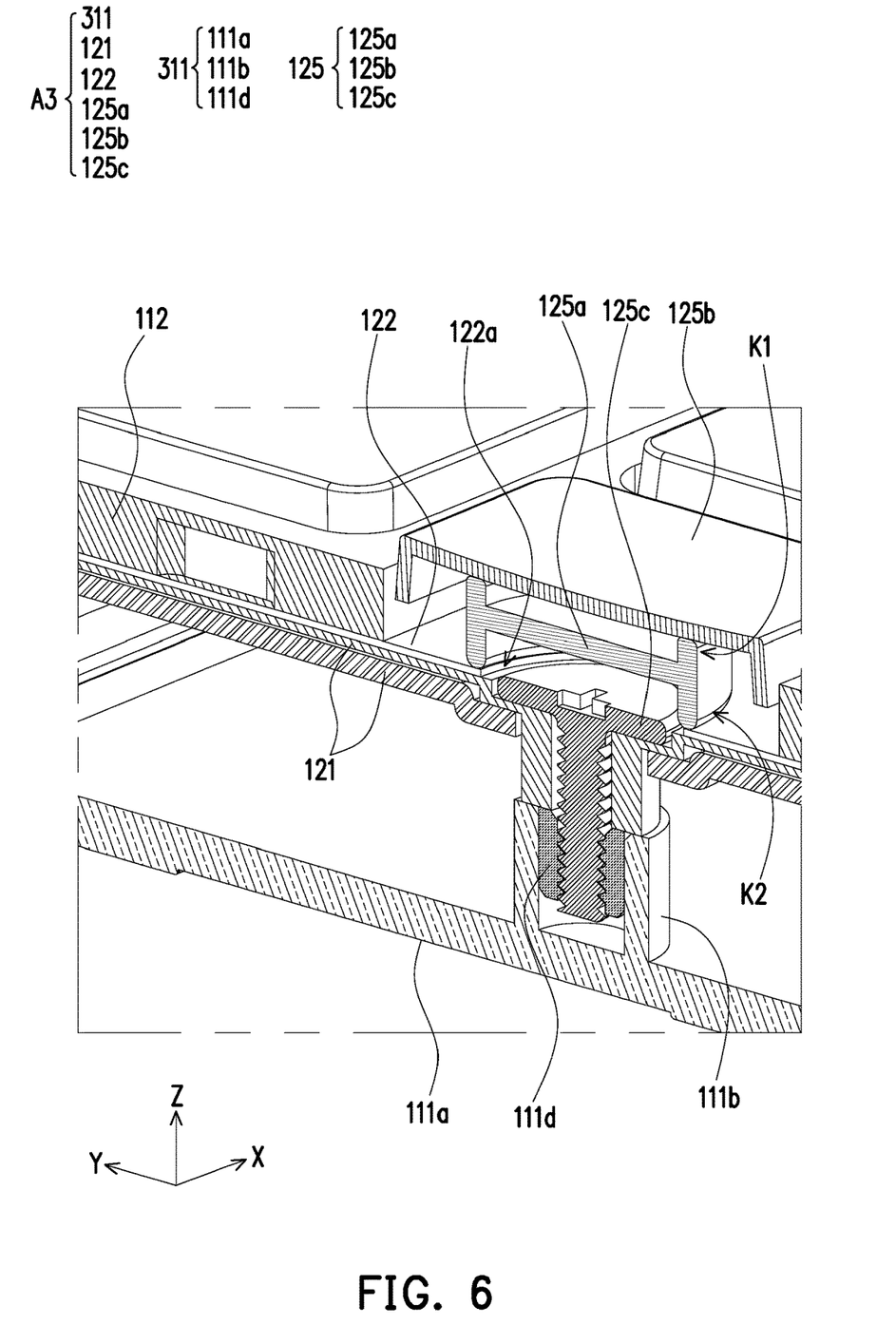
FIG. 6 is another partial cross-sectional view of the portable computer in FIG. 1.

FIG. 6 is another partial cross-sectional view of the portable computer in FIG. 1. Please refer to FIG. 6 and compare FIG. 6 with FIG. 1. The embodiment is a partial cross-sectional view of the key 125 shown in FIG. 1. A key structure A3 of the embodiment substantially includes a base 311, the bracket 121, the sensing circuit 122, an elastic member 125a, a key cap 125b, and a screwing member 125c. The bracket 121, the sensing circuit 122, the elastic member 125a, the key cap 125b, and the screwing member 125c are substantially the same as the embodiment shown in FIG. 3, but the difference is that the base 311 of the embodiment substantially only includes the bottom shell 111a, the protruding post 111b, and the stud 111d. In other words, the screwing member 125c of the embodiment and the screwing member 123c of the previous embodiment are all screwed to the stud 111d inside the protruding post 111b, and achieve the effect of being screwed to and combined with the bottom shell 111a, but the screwing member 125c of the embodiment and the screwing member 123c of the previous embodiment do not pass through the circuit board 111c of the previous embodiment. In other words, the key structure A3 of the embodiment is a screwing mechanism adapted to be located inside the body 110 but outside the range of the circuit board 111c.

The summary of the above three embodiments reflects that different parts in the body 110 of the portable computer 100 can provide corresponding screwing mechanisms in response to structural differences. But what remains unchanged is that the keyboard module 120 can utilize the inner range of the key structures A1 to A3 through the screwing members 123c, 124c, and 125c to produce a combination and fixation effect on the base 111 of the body 110 in a compact structure, is covered and shielded by the elastic members 123a, 124a, and 125a and the key caps 123b, 124b, and 125b, and provides the portable computer 100 with a simple appearance due to the hidden state.

To sum up, in the above-mentioned embodiments of the disclosure, the key structure screws the bracket to the base through the screwing member. The sensing circuit has the opening, and the screwing member first passes through the opening and is screwed to the base, and then assembled thereon with the elastic member and the key cap in sequence, so as to achieve the state of coaxial arrangement of the key cap, the elastic member, and the screwing member, that is, the elastic member spans and covers the opening and the screwing member, and the key cap covers the elastic member.

In other words, the key structure of the disclosure and the portable computer using the same can effectively simplify the assembly type of the keyboard module on the body through the configuration of the above-mentioned components, which is equivalent to the keyboard module and the body being able to be screwed together through the aforementioned screwing member. In this way, the peripheral structure for the existing keyboard module configured to be assembled with the body can be simplified, and the inner space of the key structure is utilized as the screwing space of the screwing member, which can further make the assembly type between the keyboard module and the body be further compacted.

As far as the body is concerned, the above-mentioned key structure and the keyboard module are equivalent to being disassembled from the top side of the body, so the user can smoothly assemble the keyboard module to the body or disassemble the keyboard module from the body without repeatedly turning over the body as mentioned above. Moreover, such a compact and centralized disassembly structure facilitates the improvement in the operation efficiency of assembly and maintenance.

What is claimed is:

1. A key structure, comprising:
   a base;
   a bracket, disposed on the base;
   a sensing circuit, disposed on the bracket, and the sensing circuit having an opening;
   an elastic member, disposed on the sensing circuit and covering the opening;
   a key cap, disposed on the elastic member and shielding the elastic member; and
   a screwing member, passing through the opening and screwing the bracket to the base, wherein the key cap, the elastic member, and the screwing member are coaxially arranged, and the elastic member covers and shields the screwing member, wherein the screwing member is screwed in a top-to-bottom direction from the bracket toward the base.

2. The key structure according to claim 1, wherein a central section of the elastic member is H-shaped and has an upper skirt portion and a lower skirt portion corresponding to each other, the key cap abuts on the upper skirt portion, the lower skirt portion spans and surrounds the opening, and the lower skirt portion abuts on the sensing circuit.

3. The key structure according to claim 1, wherein the sensing circuit comprises:
   an upper circuit layer, a lower skirt portion of the elastic member abutting on the upper circuit layer;
   a lower circuit layer, disposed on the bracket; and
   an insulating layer, disposed between the upper circuit layer and the lower circuit layer,
   when the key cap is not pressed by an external force, a conductive portion of the upper circuit layer and a conductive portion of the lower circuit layer face each other across a gap, and when the key cap is pressed by an external force, the key cap exerts force on the upper circuit layer through the elastic member, so that the conductive portion of the upper circuit layer and the conductive portion of the lower circuit layer abut on each other through the gap and conduct electrical conduction.

4. The key structure according to claim 3, wherein the conductive portion of the upper circuit layer surrounds the opening, and the conductive portion of the lower circuit layer surrounds the opening.

5. The key structure according to claim 1, wherein the screwing member is a screw, the base has a protruding post, and the protruding post has a screw hole adapted for the screw.

6. The key structure according to claim 5, wherein the bracket has a convex portion that abuts on the protruding post.

7. The key structure according to claim 1, wherein the base comprises a bottom shell and a circuit board, the circuit board is assembled to the bottom shell, and the screwing member passes through the circuit board and is screwed to the bottom shell.

8. The key structure according to claim 1, wherein the base comprises a bottom shell and a circuit board, the circuit board is assembled to the bottom shell, and the screwing member is screwed to the bottom shell and is located outside a range of the circuit board.

9. The key structure according to claim 1, wherein the base comprises a bottom shell, a circuit board, and a stud, the circuit board is assembled to the bottom shell, the stud is disposed at the circuit board, and the screwing member is screwed to the stud.

10. A portable computer, comprising:
a body, having a base;
a keyboard module, comprising a bracket, a sensing circuit, and at least one key, the bracket being disposed on the base, the sensing circuit being disposed on the bracket, and the sensing circuit having at least one opening, the key comprising:
an elastic member, disposed on the sensing circuit and covering the opening;
a key cap, detachably abutting on the elastic member; and
a screwing member, passing through the opening and screwing the bracket to the base, wherein the key cap, the elastic member, and the screwing member are coaxially arranged, wherein the screwing member is screwed in a top-to-bottom direction from the bracket toward the base.

11. The portable computer according to claim 10, wherein a central section of the elastic member is H-shaped and has an upper skirt portion and a lower skirt portion corresponding to each other, the key cap abuts on the upper skirt portion, the lower skirt portion spans and surrounds the opening, and the lower skirt portion abuts on the sensing circuit.

12. The portable computer according to claim 10, wherein the sensing circuit comprises:
an upper circuit layer, a lower skirt portion of the elastic member abutting on the upper circuit layer;
a lower circuit layer, disposed on the bracket; and
an insulating layer, disposed between the upper circuit layer and the lower circuit layer,
when the key cap is not pressed by an external force, a conductive portion of the upper circuit layer and a conductive portion of the lower circuit layer face each other across a gap, when the key cap is pressed by an external force, the key cap exerts force on the upper circuit layer through the elastic member, so that the conductive portion of the upper circuit layer and the conductive portion of the lower circuit layer abut on each other through the gap and conduct electrical conduction.

13. The portable computer according to claim 12, wherein the conductive portion of the upper circuit layer surrounds the opening, and the conductive portion of the lower circuit layer surrounds the opening.

14. The portable computer according to claim 10, wherein the screwing member is a screw, the base has a protruding post, and the protruding post has a screw hole adapted for the screw.

15. The portable computer according to claim 14, wherein the bracket has a convex portion that abuts on the protruding post.

16. The portable computer according to claim 10, wherein the base comprises a bottom shell and a circuit board, the circuit board is assembled to the bottom shell, and the screwing member passes through the circuit board and is screwed to the bottom shell.

17. The portable computer according to claim 10, wherein the base comprises a bottom shell and a circuit board, the circuit board is assembled to the bottom shell, and the screwing member is screwed to the bottom shell and is located outside a range of the circuit board.

18. The portable computer according to claim 10, wherein the base comprises a bottom shell, a circuit board, and a stud, the circuit board is assembled to the bottom shell, the stud is disposed at the circuit board, and the screwing member is screwed to the stud.

* * * * *